US009154367B1

(12) United States Patent
Kontothanassis et al.

(10) Patent No.: US 9,154,367 B1
(45) Date of Patent: Oct. 6, 2015

(54) LOAD BALANCING AND CONTENT PRESERVATION

(75) Inventors: Leonidas Kontothanassis, Lexington, MA (US); Paul Schultz, Saratoga, CA (US); David Presotto, Palo Alto, CA (US); Ankur Jain, Mountain View, CA (US)

(73) Assignee: Google Inc., Mountain View, CA (US)

( * ) Notice: Subject to any disclaimer, the term of this patent is extended or adjusted under 35 U.S.C. 154(b) by 258 days.

(21) Appl. No.: 13/338,024

(22) Filed: Dec. 27, 2011

(51) Int. Cl.
| | | |
|---|---|---|
| G06F 15/173 | (2006.01) |
| H04L 29/08 | (2006.01) |
| H04L 12/24 | (2006.01) |
| H04L 29/14 | (2006.01) |
| H04L 12/70 | (2013.01) |
| H04L 12/703 | (2013.01) |
| G06F 11/20 | (2006.01) |

(52) U.S. Cl.
CPC ...... *H04L 29/08279* (2013.01); *H04L 41/0654* (2013.01); *H04L 67/1034* (2013.01); *G06F 11/202* (2013.01); *G06F 11/2023* (2013.01); *H04L 45/28* (2013.01); *H04L 69/40* (2013.01); *H04L 2012/5627* (2013.01)

(58) Field of Classification Search
CPC .............. H04L 29/08279; H04L 2012/5627; H04L 41/0654; H04L 45/28; H04L 67/1034; H04L 69/40; G06F 11/202; G06F 11/2023
USPC ......... 709/203, 217, 219, 223, 224, 225, 226, 709/238, 245; 370/216
See application file for complete search history.

(56) References Cited

U.S. PATENT DOCUMENTS

| | | | | |
|---|---|---|---|---|
| 6,108,300 | A * | 8/2000 | Coile et al. ..................... 370/217 |
| 6,470,389 | B1 * | 10/2002 | Chung et al. .................. 709/227 |
| 2002/0073354 | A1 * | 6/2002 | Schroiff et al. ..................... 714/4 |
| 2002/0133491 | A1 * | 9/2002 | Sim et al. ......................... 707/10 |
| 2003/0018927 | A1 * | 1/2003 | Gadir et al. ........................ 714/4 |
| 2003/0237018 | A1 * | 12/2003 | Baba ................................. 714/4 |
| 2004/0153708 | A1 * | 8/2004 | Joshi et al. ........................ 714/4 |
| 2004/0243650 | A1 * | 12/2004 | McCrory et al. .............. 707/203 |
| 2005/0125557 | A1 * | 6/2005 | Vasudevan et al. ........... 709/239 |
| 2005/0159927 | A1 * | 7/2005 | Cruz et al. ..................... 702/188 |
| 2006/0050629 | A1 * | 3/2006 | Saika ............................. 370/216 |
| 2006/0080569 | A1 * | 4/2006 | Sciacca ............................. 714/4 |
| 2006/0190760 | A1 * | 8/2006 | Saika ................................ 714/4 |
| 2006/0206611 | A1 * | 9/2006 | Nakamura ..................... 709/226 |
| 2007/0233746 | A1 * | 10/2007 | Garbow et al. ............... 707/200 |

(Continued)

*Primary Examiner* — Liangche A Wang
*Assistant Examiner* — Johnny Aguiar
(74) *Attorney, Agent, or Firm* — Edward A. Gordon; John D. Lanza; Foley & Lardner LLP (57) ABSTRACT

Methods, systems, and apparatus, including computer programs encoded on a computer storage medium, for receiving a plurality of requests from a plurality of client devices sent to a public internet protocol address; routing the requests to one or more internal Internet protocol addresses, where the one or more internal Internet protocol addresses correspond to one or more compute nodes, and where the one or more compute nodes process the routed requests; determining a particular compute node is offline, where the particular compute node is assigned one or more internal Internet protocol addresses; in response to the determination that the particular node is offline, reassigning the one or more internal Internet protocol addresses corresponding to the particular compute node to one or more different compute nodes, where requests communicated to the reassigned internal Internet protocol addresses are communicated to the one or more different compute nodes for processing.

24 Claims, 6 Drawing Sheets

(56) References Cited

U.S. PATENT DOCUMENTS

| | | | |
|---|---|---|---|
| 2008/0259797 A1* | 10/2008 | Gruper et al. | 370/235 |
| 2009/0019164 A1* | 1/2009 | Brown et al. | 709/227 |
| 2009/0158082 A1* | 6/2009 | Jain et al. | 714/4 |
| 2009/0300407 A1* | 12/2009 | Kamath et al. | 714/4 |
| 2010/0265824 A1* | 10/2010 | Chao et al. | 370/235 |
| 2010/0332664 A1* | 12/2010 | Yevmenkin et al. | 709/227 |
| 2011/0047252 A1* | 2/2011 | Kwapniewski et al. | 709/220 |
| 2011/0307541 A1* | 12/2011 | Walsh et al. | 709/203 |
| 2011/0307736 A1* | 12/2011 | George et al. | 714/6.2 |
| 2013/0151646 A1* | 6/2013 | Chidambaram et al. | 709/213 |
| 2013/0191658 A1* | 7/2013 | Malik et al. | 713/300 |

* cited by examiner

LOAD BALANCING AND CONTENT PRESERVATION

BACKGROUND

This specification relates to load balancing.

Servers (e.g., front-end servers) can receive various kinds of requests and can forward the received requests to other servers (e.g., back-end servers) for processing. The requests can be forwarded in a manner that distributes the processing workload.

SUMMARY

In general, one aspect of the subject matter described in the specification can be embodied in methods that include the actions of receiving a plurality of requests from a plurality of client devices sent to a public internet protocol address; routing the requests to one or more internal Internet protocol addresses, where the one or more internal Internet protocol addresses correspond to one or more compute nodes, and where the one or more compute nodes process the routed requests; determining a particular compute node is offline, where the particular compute node is assigned one or more internal Internet protocol addresses; in response to the determination that the particular node is offline, reassigning the one or more internal Internet protocol addresses corresponding to the particular compute node to one or more different compute nodes, where requests communicated to the reassigned internal Internet protocol addresses are communicated to the one or more different compute nodes for processing.

These and other aspects can optionally include one or more of the following features. Routing the requests to one or more internal Internet protocol addresses includes using a hash table to hash an incoming request to a particular internal Internet protocol address. The one or more internal Internet protocol addresses correspond to one or more compute nodes based in part on a Media Access Control address corresponding to the internal Internet protocol address, where the Media Access Control address is identified by performing a lookup operation in an Address Resolution Protocol table. Routing the requests to one or more internal Internet protocol addresses, where the one or more internal Internet protocol addresses correspond to one or more compute nodes includes communicating the request to Media Access Control addresses corresponding to the one or more internal Internet protocol addresses.

A public Internet protocol address is associated with one or more internal Internet protocol addresses using equal-cost multi-path routing techniques. Determining a particular compute node in a plurality of compute nodes is offline includes: monitoring a broadcast from the particular compute node, where the broadcast is communicated at a first specified time interval; and determining a disruption in the broadcast from the particular compute node in a case where the broadcast is not received within a second specified time interval. Reassigning the internal Internet protocol addresses associated with the particular compute node to one or more different compute nodes includes updating, in an Address Resolution Protocol table, one or more Media Access Control addresses corresponding to the internal Internet protocol addresses, where the one or more Media Access Control addresses are associated with the one or more different compute nodes.

Reassigning the internal Internet protocol addresses further includes: determining a historical computing workload data for each internal IP address in a content cluster; determining a failover order for each internal IP address with respect to a plurality of compute nodes; and assigning one or more internal internet protocol addresses to the plurality of compute nodes.

In general, one aspect of the subject matter described in the specification can be embodied in methods that include the actions of determining a particular compute node in a plurality of compute nodes is online, where the particular compute node was previously assigned one or more internal Internet protocol addresses; in response to the determination, reclaiming the internal Internet protocol addresses that were previously associated with the particular compute node from one or more different compute nodes, where requests communicated to the reclaimed internal Internet protocol addresses are communicated to the particular compute node for processing.

These and other aspects can optionally include one or more of the following features. Determining a particular compute node in a plurality of compute nodes is online includes receiving a broadcast from the particular compute node, where the broadcast is specifies the internal Internet protocol addresses that were previously associated with the particular compute node. Reclaiming the internal Internet protocol addresses that were previously associated with the particular compute node from one or more different compute nodes includes updating, in an Address Resolution Protocol table, a Media Access Control address for the internal Internet protocol address, where the Media Access Control address is associated with the particular compute node.

Particular embodiments of the subject matter described in this specification can be implemented so as to realize one or more of the following advantages.

Load balancing can be achieved using one or more switches, without relying on hardware load balancer devices that distribute requests to different machines. Load balancing can be achieved using one or more switches configured to distribute requests to different internal Internet Protocol (IP) addresses rather than using a switch that distributes requests to different compute nodes. Unlike a switch that distributes requests to different compute nodes, which results in resetting all connections between clients and compute nodes when a compute node fails or returns online, connections between clients and online compute nodes can be maintained in the presence of compute node failures, since the resetting of existing connections can be limited to offline compute nodes. The number of public Internet Protocol addresses needed to achieve load balancing can be reduced by leveraging internal IP addresses. Requests sent to a content cluster through public IP addresses can be received by a front-end switch and routed to one or more internal IP addresses, where the internal IP addresses are assigned to compute nodes. One or more internal IP addresses are assigned to compute nodes, such that requests routed to the one or more internal IP addresses are received and processed by the corresponding compute node. The assignments of internal IP addresses to compute nodes can be maintained in an address resolution protocol (ARP) table.

The front-end switch can use a hash function to route incoming requests to one or more internal IP addresses. By routing requests to internal IP addresses, the content cluster can limit the resetting of existing connections established between clients and compute nodes to connections with compute nodes that are offline. Public IP addresses, which can be limited in quantity, do not need to be assigned to compute nodes, since compute nodes are assigned internal IP addresses. Internal IP addresses assigned to a compute node that goes offline can be reallocated to other compute nodes based in part on a specified priority order. Compute nodes that return to an online state can reclaim internal IP addresses that were previously assigned to those compute nodes. As a result, the computing load associated with the content cluster can be distributed so as to improve load balancing among the compute nodes when the compute nodes fail or return online.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Content clusters (e.g., web servers) can include several compute nodes that have been networked together to distribute computational workload. User requests received by a content cluster can be allocated among the compute nodes so that each compute node processes roughly the same number of requests.

In some implementations, a content cluster includes two or more compute nodes for processing user requests. Clients can send requests to the content cluster using a one or more publicly facing virtual internet protocol (IP) addresses. A publicly facing (or "public") IP is an internet protocol address that is accessible by a client from a public network (e.g., the internet). Requests sent to public IP addresses can be received by a front-end switch. The front-end switch can route the requests to one or more internal internet protocol (IP) addresses. An internal IP address can be an IP address that falls within an internal network address space (e.g., IP addresses within a range 10.0.0.0-10.255.255.255, 172.16.0.0-172.31.255.255, and 192.168.0.0-192.168.255.255) that is ordinarily not accessible from a public network (e.g., the internet).

One or more internal IP addresses can be associated with compute nodes within the content cluster such that a request sent to a public IP can be routed to an internal IP address. A compute node associated with the internal IP address then processes the request. In some implementations, public IP addresses are routed to an internal IP address using a hash function, where the hash function is used to route an incoming request to a particular internal IP address, and where a compute node associated with the internal IP address processes the request.

Internal IP addresses associated with a particular compute node can be reassigned to one or more different compute nodes in the event the particular compute node goes offline, so that requests forwarded to those internal IP addresses can continue to be processed by the different compute nodes. In some implementations, internal IP addresses can be reassigned to one or more different compute nodes in response to addition of new compute nodes to the content cluster. The reassignment of internal IP addresses can be based on a specified priority order, where the internal IP addresses are reassigned in a manner that balances the workload among the nodes in the content cluster. Reassigned internal IP addresses that were previously associated with a particular compute node can be reclaimed by the particular compute node once it returns to an online state or is available again to process requests, such that requests forwarded to the reclaimed internal IP addresses are processed by the particular compute node.

Figure 1:
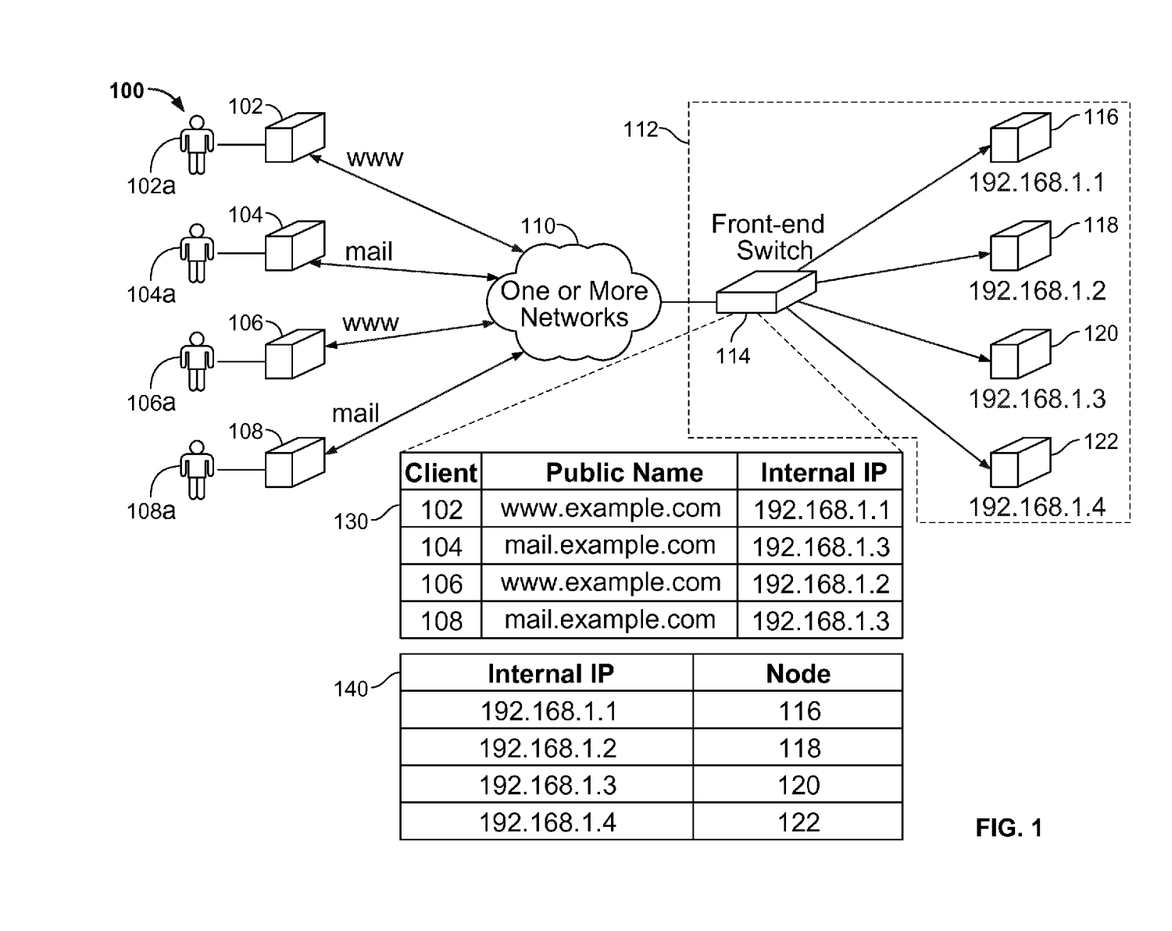
FIG. 1 illustrates interaction between clients and an example content cluster.

FIG. 1 illustrates interaction between clients and an example content cluster 112. A system 100 includes one or more client devices (client devices 102, 104, 106, and 108) that can communicate through one or more networks 110 with a content cluster 112. Client devices can include, for example, computers, laptops, tablet devices, and mobile devices. The content cluster 112 includes a front-end switch 114 (e.g., a networking switch) and a collection of compute nodes 116, 118, 120, and 122. A given compute node can include one or more data processing apparatus. The front-end switch 114 can communicate with the compute nodes 116, 118, 120, and 122 using one or more networks (e.g., the internet, a local area network, or a wide area network) or other communication means.

The compute nodes 116, 118, 120, and 122 can communicate with each other and with storage systems at various times using one or more computer networks or other communication means. For example, the front-end switch 114 and the compute nodes 116, 118, 120, and 122 in the content cluster 112 can be coupled to an intranet. A computer program can execute on a single compute node or, alternatively, the program can be organized into components that execute on multiple compute nodes. There can be more than one instance or copy of a given computer program executing on the collection of servers at any given time.

Users 102a, 104a, 106a, and 108a interact with client devices 102, 104, 106, and 108, respectively, to access services (e.g., e-mail, websites, and file transfers) by connecting to one or more public domain names associated with those services (e.g., www.example.com, mail.example.com, and ftp.example.com). In particular, public domain names addresses can be accessed by clients using the one or more networks 110. Public domain names can be associated with one or more public IP addresses.

The example front-end switch 114 hosts the public domain name for a website (e.g., "www.example.com"), an e-mail server (e.g., "mail.example.com"), and a file transfer server (e.g., "ftp.example.com"), such that connections to these public domain names will be received by the front-end switch 114. As illustrated, client devices 102 and 106 communicate requests to access a website by connecting to the public domain name for the website (e.g., "www.example.com"), where the communication requests are answered by the front-end switch 114. Similarly, clients 104 and 108 communicate requests to access e-mail by connecting to the public domain name for the e-mail server (e.g., "mail.example.com"), where the communication requests are also answered by the front-end switch 114. In some implementations, two or more front-end switches are tasked with receiving requests from clients.

The front-end switch 114 routes requests to one or more internal IP addresses. An internal IP address can be assigned to a compute node, such that requests routed to that internal IP address are received by the corresponding compute node for processing. As illustrated, the client device 102 communicates a request to the public domain name for the website (e.g., "www.example.com"). The front-end switch 114 routes the request to an internal IP address (e.g., 192.168.1.1), where the internal IP address corresponds to a compute node 116 that is capable of processing the website request.

In some implementations, the front-end switch 114 routes the requests received from clients to internal IP addresses based on a hash table. A routing table 130 illustrates example routing results as determined by an example hash table. The hash table can receive from a client device a request directed to a destination public domain name and the hash table can output an internal IP address to which the request should be routed. An ARP table 140 illustrates a mapping between internal IP addresses and compute nodes. An ARP table can be used to map IP addresses to MAC addresses, where the MAC address corresponds to a compute node. For simplicity purposes, the ARP table 140 shows such correspondence using compute node identifiers 116, 118, 120, and 122.

As illustrated in the example ARP table 140, the front-end server 114 routes the request received from client device 102 destined for the "www.example.com" public domain name to internal IP address 192.168.1.1, which is associated with compute node 116. Similarly, the request from client 106, which was also sent to the public IP address for "www.example.com," is routed to an internal IP address 192.168.1.2, which is associated with compute node 118. Requests from client devices 104 and 108, which were sent to the public IP address for "mail.example.com" are routed to an internal IP address 192.168.1.3, which is associated with compute node 120. The compute nodes 116, 118, and 120 process the received requests and communicate the results to the respective client devices 102, 104, 106, and 108 using one or more networks (e.g., the internet) or other communication means. For example, the compute nodes 116 and 118 process and communicate resources associated with the requested web page to the client devices 102 and 106, respectively. Additionally, the compute node 120 processes and communicates mail data to the client devices 104 and 108.

Figure 2:
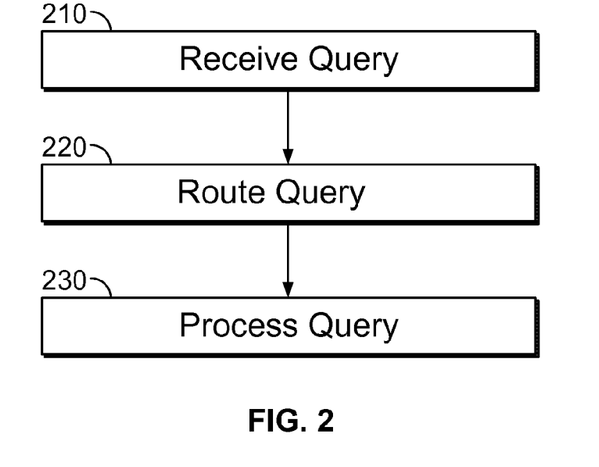
FIG. 2 is a flowchart of an example process for processing requests.

FIG. 2 is a flowchart of an example process 200 for processing requests. For convenience, the process 200 will be described with respect to a system including one or more computing devices that perform the process 200.

The system receives a request from a client (210). Requests can be received from a client communicating over a network (e.g., the internet), where the client interacts with the system using an interface, such as a network interface. Clients can send requests to one or more public IP addresses that correspond to various services. For example, a user seeking access to a website can send a request to a public IP address corresponding to "www.example.com," which is identified using a domain name system (DNS) server. Similarly, a user seeking access to an e-mail system can send a request to a public IP address for "mail.example.com."

Public IP addresses can be hosted by one or more servers that can receive and respond to requests. In some implementations, public IP addresses are hosted by one or more front-end switches that receive and route the requests to one or more compute nodes, where the compute nodes are tasked with processing and responding to the requests. Compute clusters corresponding to front-end switches can be selected based on geographical proximity to the client, availability, processing capacity, or appropriateness to a particular request (e.g., simple requests and image requests may be handled by a first front-end switch while complex requests and video requests may be handled by a second front-end switch). In some implementations, the front-end switch is a network switch that receives requests sent to one or more public IP addresses and routes the requests to one or more compute nodes. In some implementations, the front-end switch and corresponding compute nodes are co-located.

The system routes the request to an internal IP address (220). In some implementations, the front-end switch routes requests that were sent to a public IP address to one or more internal IP addresses. Internal IP addresses can be IP addresses that falls within an internal network address space (e.g., IP addresses within a range 10.0.0.0-10.255.255.255, 172.16.0.0-172.31.255.255, and 192.168.0.0-192.168.255.255) that is ordinarily not accessible from a public network (e.g., the internet). One or more internal IP address can be assigned to a compute node, such that requests directed to a particular internal IP address are sent to the compute node that is assigned to that internal IP address.

In particular, the routing of requests to different internal IP addresses can be used to distribute the processing workload among the compute nodes. Since internal IP addresses can be reassigned to different compute nodes, the number of compute nodes in the system can be increased or decreased. In some implementations, the front-end switch uses equal-cost multi-path routing (ECMP) to route requests sent to public IP addresses to one or more internal IP addresses. For example, a request sent to a public IP address for "www.example.com" can be received and routed by a front-end switch to an internal IP address 192.168.1.15.

The routing of requests from public IP addresses to internal IP addresses can be accomplished using a specified order. For example, a first, second, and third request can be routed to internal IP addresses 192.168.1.1, 192.168.1.2, and 192.168.1.3, respectively. In some implementations, the system routes requests from public IP addresses to internal IP addresses using a hash table. A hash table can be a data structure that is accessible by a hash function that provides an output (e.g., internal IP address) based on an input (e.g., request).

In some implementations, one or more internal IP addresses correspond to a compute node, where requests routed to the one or more internal IP addresses are sent to the corresponding compute node for processing. For example, a system can include a front-end switch that hosts a public IP address for "www.example.com," together with eight compute nodes, where an internal IP address is assigned each compute node. In this example, the system can route a request sent to the public IP for "www.example.com" by hashing the request to obtain an internal IP address and routing the request to the obtained internal IP address. A compute node to which the internal IP address is assigned can receive and process the request.

In various implementations, the assignment of internal IP addresses to compute nodes is accomplished using an address resolution protocol (ARP) table that resides on one or more front-end switches. An ARP table can be used to resolve a network layer address (e.g., an internal IP address) to a link layer address (e.g., a media access control (MAC) address). In some implementations, the ARP table resolves an internal IP address to MAC address, where the MAC address is a network address that corresponds to a compute node (e.g., a network interface card belonging to the compute node). Accordingly, a request routed to an internal IP address can be forwarded to a particular compute node by sending that request to a MAC address associated with the compute node, as specified in the ARP table.

The system processes the request and returns a response to the client from which the request originated (230). In particular, the compute node that received the routed request processes the request and returns a response to the client that originally sent the request.

Figure 3:
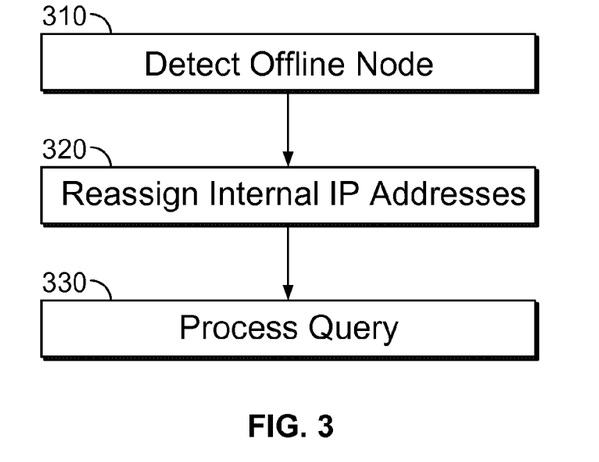
FIG. 3 is a flowchart of an example process for a node failure scenario.

FIG. 3 is a flowchart of an example process 300 for a node failure scenario. For convenience, the process 300 will be described with respect to a system including one or more computing devices that perform the process 300.

The system detects that a compute node is offline (310). In various implementations, compute nodes in a content cluster having multiple compute nodes communicate among one another by broadcasting (e.g., multicasting) messages. Messages broadcasted by a compute node can be received and processed by other compute nodes within the content cluster.

In some implementations, each compute node in the content cluster broadcasts status messages to other compute nodes at a specified time interval, where the status messages specify the internal IP addresses that are assigned to the broadcasting compute node. In some implementations, compute nodes in a content cluster are able to detect that a particular compute node is offline by detecting an interruption in the broadcasting of status messages from the particular compute node. For example, each compute node in a content cluster can broadcast status messages to the other compute nodes at a specified time interval (e.g., every 1 second). In this example, compute nodes can detect that a particular compute node is offline if the compute nodes do not receive a status message from the particular compute node within a specified time interval (e.g., every 3 seconds). In some implementations, compute nodes communicate status information using a virtual router redundancy protocol (VRRP).

The system reassigns internal IP addresses that were assigned to the offline compute node to one or more different compute nodes (320). Each compute node can have one or more assigned internal IP addresses. A compute node that is offline can no longer receive and processes requests that are routed to the internal IP addresses that were assigned to the offline compute node. Accordingly, internal IP addresses that are assigned to an offline compute node can be reassigned to one or more different compute nodes, such that requests sent to the reassigned internal IP addresses can be received and processed by one or more different compute nodes. In some implementations, the reassignment is performed by one or more compute nodes. A compute node that is assuming responsibility for one or more internal IP addresses can start receiving and processing requests that are routed to the one or more internal IP addresses.

In some implementations, the reassignment of an internal IP address to a compute node is accomplished by updating the ARP table. In such implementations, a compute node that is assuming responsibility for an internal IP address updates the ARP table to specify that the reassigned internal IP addresses should resolve to the MAC address corresponding to the compute node assuming responsibility. For example, if a first compute node that is assigned internal IP addresses 192.168.1.1 and 192.168.1.2 goes offline, then a second compute node can assume responsibility for processing requests sent to internal IP addresses 192.168.1.1 and 192.168.1.2 by updating the ARP table to specify that any requests routed to these internal IP addresses should resolve to the MAC address corresponding to the second compute node.

In another example, if a first compute node that is assigned internal IP addresses 192.168.1.1 and 192.168.1.2 goes offline, then a second compute node can assume responsibility for processing requests sent to internal IP address 192.168.1.1 and a third compute node can assume responsibility for processing requests sent to internal IP address 192.168.1.2, by updating the ARP table to specify that any requests routed to these internal IP addresses should resolve to the MAC address corresponding to the second compute node and the third compute node, respectively.

The order in which compute nodes assume responsibility for internal IP addresses can be specified. In some implementations, the reassignment of internal IP addresses is performed based in part on a specified priority order, where the internal IP addresses are reassigned to the remaining compute nodes in a manner that balances the workload among the compute nodes in the content cluster.

In some implementations, the priority order is determined in an offline process that analyzes historical computing workload data for each internal IP address in a content cluster. For example, the system can analyze the number of requests that were sent to a particular internal IP address and the complexity of the requests (e.g., the amount of time it took to process the requests). Internal IP addresses that received more requests or more complex requests can be reassigned to compute nodes that have a history of low computing workload while internal IP addresses that received fewer requests or less complex requests can be reassigned to compute nodes that have a history of high computing workload.

In some other implementations, the priority order is determined by performing a search to determine reassignments of internal IP addresses that were assigned to a compute node that has failed. The reassignments can be performed in a manner that preserves a balanced computing workload between the compute nodes. In some implementations, the exhaustive search is performed based on a historical computing workload for compute nodes. For example, a compute cluster consisting of a first, second, and third compute node. A search can be performed to determine whether the first or second compute node should be reassigned an internal IP address that was assigned to the third compute node, in the event the third compute node fails.

Similarly, a search can be performed to determine whether the first or third compute node should be reassigned an internal IP address that was assigned to the second compute node, in the event the second compute node fails. Further, a search can be performed to determine whether the second or third compute node should be reassigned an internal IP address that was assigned to the first compute node, in the event the first compute node fails. In some implementations, a search is performed to determine reassignments of internal IP addresses that were assigned to a compute node that has failed, where the failed compute node was assigned two or more internal IP addresses, and where the two or more internal IP addresses are reassigned to two or more different compute nodes.

Thus, the system can determine a priority order for each internal IP address with respect to each compute node in the content cluster. For example, an internal IP address 192.168.1.5 that is assigned to a first compute node can be reassigned to a second compute node in the event the first compute node fails. Similarly, the internal IP address 192.168.1.5 can be reassigned to a third compute node in the event the second compute node fails. In this example, the priority order for the second and third compute nodes is determined by analyzing historical computing load data for the second and third compute nodes to determine that the second compute node has a lower computing workload than the third compute node, such that reassigning the internal IP to the second compute node better balances the overall workload among the compute nodes.

In some other implementations, the priority order is determined in an online process by analyzing real-time computing workload data for each internal IP address in a content cluster, where the internal IP addresses are reassigned to one or more computer nodes in a manner that balances the overall workload among the compute nodes. According to such implementations, the system determines a priority order for each internal IP address with respect to each compute node in the content cluster.

The system processes the request and returns a response to the client from which the request originated (330). In particular, the reassigned compute node that received the request processes the request and returns a response to the client that originally sent the request.

Figure 4:
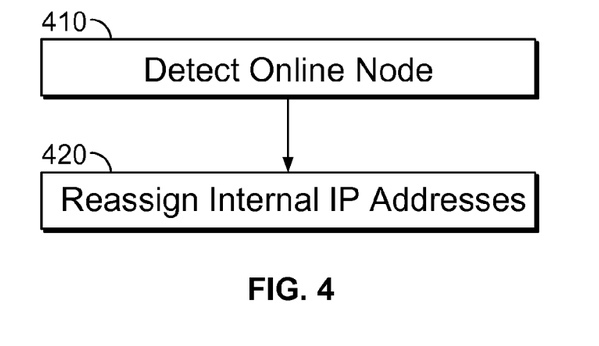
FIG. 4 is a flowchart of an example process for a node recovery scenario.

FIG. 4 is a flowchart of an example process 400 for a node recovery scenario. For convenience, the process 400 will be described with respect to a system including one or more computing devices that perform the process 400.

The system detects that a compute node is online (410). In various implementations, compute nodes in a content cluster communicate among one another by broadcasting (e.g., multicasting) messages. Messages broadcasted by a compute node can be received and processed by other compute nodes within the content cluster. In some implementations, each compute node in the content cluster broadcasts status messages to other compute nodes at a specified time interval, where the status messages specify that the broadcasting compute node is online and is reclaiming one or more internal IP addresses that it was previously assigned. Compute nodes in a content cluster are able detect that a particular compute node is online upon receipt of such broadcast. Upon detecting that a particular compute node is online, other compute nodes that had assumed responsibility for internal IP addresses that were previously assigned to the particular compute node can release those internal IP addresses so they may be reclaimed by the particulate compute node. In some implementations, compute nodes communicate status information using the Virtual Router Redundancy Protocol (VRRP). In some implementations, the system detects new compute nodes that have been added to the content cluster, where the system assigns internal IP addresses to the new compute nodes for receiving and processing requests.

The system returns the reassigned internal IP addresses to the online compute node (420). In some implementations, a compute node that returns to an online state reclaims internal IP addresses that were previously assigned to it by broadcasting status messages to other compute nodes. The status messages can indicate that the broadcasting compute node is online and is reclaiming one or more internal IP addresses. For example, a particular compute node that returns to an online state can broadcast that it is reclaiming internal IP addresses 192.168.1.1 and 192.168.1.2. Upon receiving the status messages, compute nodes that were assigned the internal IP addresses 192.168.1.1 and 192.168.1.2 (e.g., when the particular compute node went offline) can release the internal IP addresses so that they may be reclaimed by the now online compute node.

In some implementations, a compute node reclaims internal IP addresses that were previously assigned to it by updating the ARP table. In such implementations, the compute node reclaiming an internal IP address updates the ARP table to specify that the reclaimed internal IP addresses should resolve to the MAC address corresponding to that compute node. For example, if a particular compute node, which was previously assigned an internal IP address 192.168.1.1, comes back online, then the particular compute node can reclaim the previously assigned internal IP address 192.168.1.1 by updating the ARP table to specify that any requests routed to these internal IP addresses should resolve to the MAC address for the particular compute node.

In some other implementations, a compute node reclaims internal IP addresses based in part on a specified priority order, where the internal IP addresses are reclaimed if the priority order for the reclaiming compute node is higher than the priority order for the other compute nodes. For example, a content cluster can include a first, second, and third compute node, where the first compute node has a priority of 2 for an internal IP address 192.168.1.2, where the second node has a priority of 1, and where the third compute node has a priority of 3. In this example, the second compute node has the highest priority order for the internal IP address 192.168.1.2 and, therefore, can reclaim that internal IP address from the first or third compute node at any time. Furthermore, if the second compute node were to go offline, the third compute node would have the next highest priority order for the internal IP address 192.168.1.2 and, therefore, can assume responsibility for that internal IP address. Finally, if the third compute node were to go offline, the first compute node would have the next highest priority order for the internal IP address 192.168.1.2 and, therefore, can assume responsibility for that internal IP address next.

In various implementations, a compute node that alternates between an online and an offline state for a specified number of times throttles the reclaiming process. For example, if a compute node alternates between an online and offline state more than three times within the past 60 seconds, then the compute node can delay reclaiming internal IP addresses to prevent disrupting the system. Since a number of operations may need to be completed during the reclaiming process (e.g., establishing connections between a client and the reclaiming compute node), throttling the reclaiming process can help minimize the disruption of request processing by the system when the reclaiming compute node is behaving erratically.

Figure 5A:
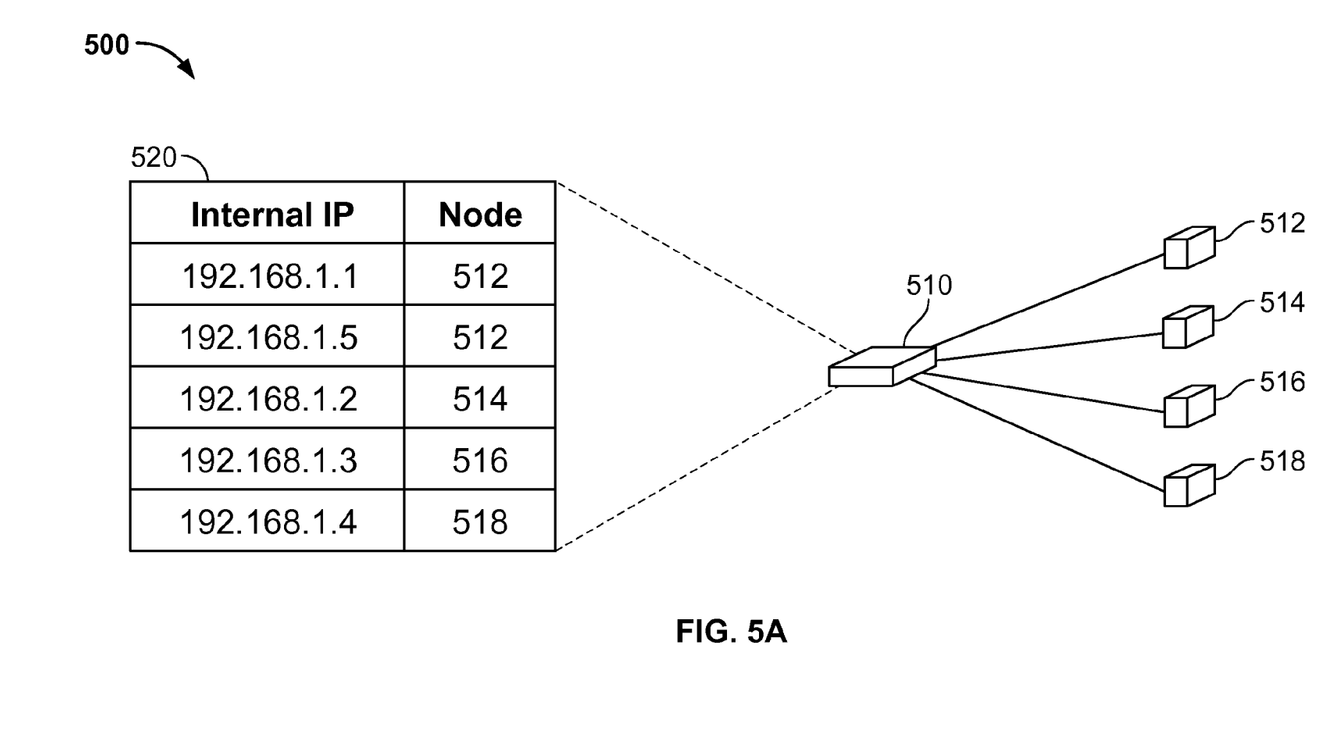
FIGS. 5A and 5B are illustrations of an example node failure scenario.

FIG. 5A is an illustration of a node failure scenario in an example system 500. The example system 500 includes a front-end switch 510 (e.g., a networking switch) and compute nodes 512, 514, 516, and 518. An ARP table 520 that resides on the front-end switch 510 is shown. According to the ARP table 520, client requests routed to internal IP addresses 192.168.1.1 and 192.168.1.5 are processed by compute node 512, client requests routed to internal IP address 192.168.1.2 are processed by compute node 514, client requests routed to internal IP address 192.168.1.3 are processed by compute node 516, and client requests routed to internal IP address 192.168.1.4 are processed by compute node 518.

Figure 5B:
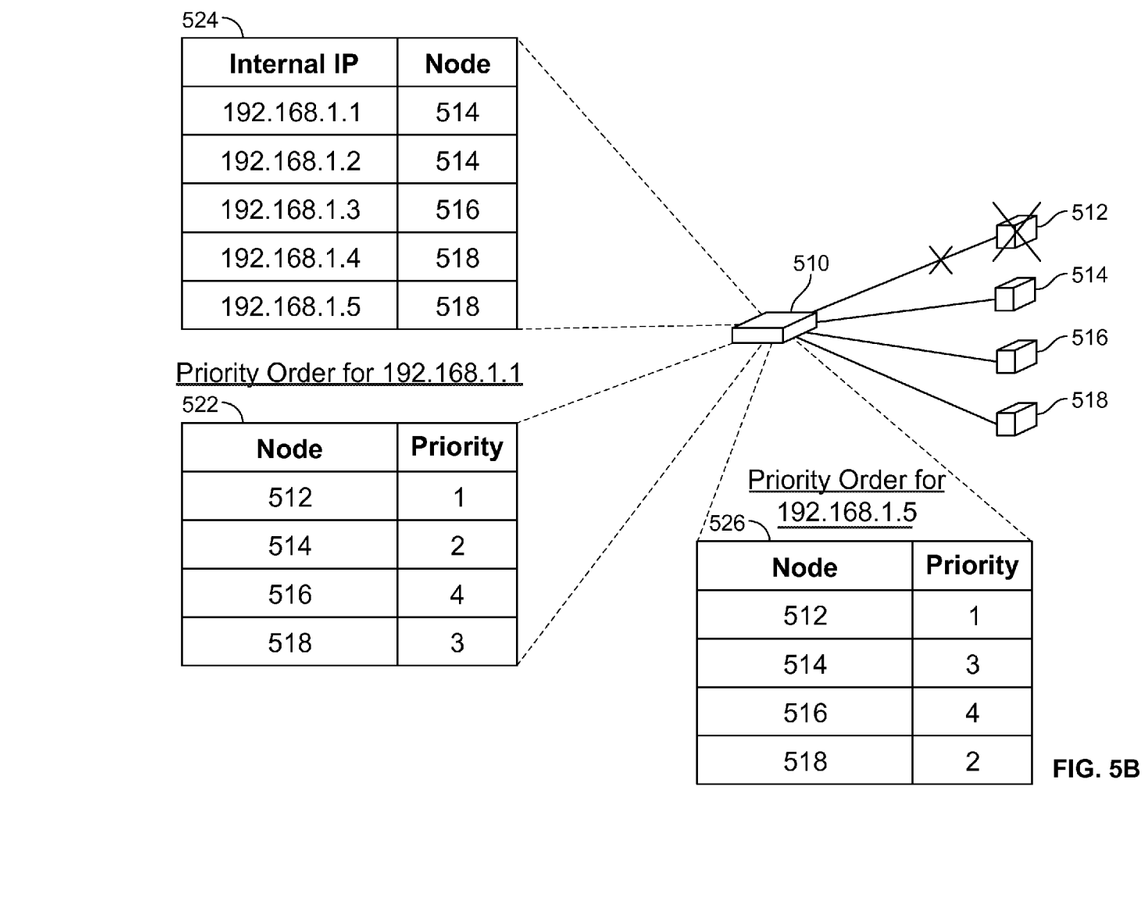

FIG. 5B is an illustration of a node failure scenario in an example system 500. The example system 500 includes a front-end switch 510 (e.g., a networking switch) and compute nodes 512, 514, 516, and 518. An ARP table 524 that resides on the front-end switch 510 is shown. In FIG. 5B, the compute node 512 is now offline and can no longer process requests routed to the internal IP addresses 192.168.1.1 and 192.168.1.5. Accordingly, the system must reassign internal IP addresses that were originally assigned to the now offline compute node 512 to a new compute node, such that requests sent to the reassigned internal IP addresses can be received and processed by the new compute node.

In some implementations, the reassignment of internal IP addresses is performed based in part on a specified priority order. The specified priority order can indicate which compute node should assume responsibility for an internal IP address in the event a particular compute node goes offline. Accordingly, the system 500 reassigns the internal IP addresses 192.168.1.1 and 192.168.1.5 by determining which compute nodes should assume responsibility. The priority order table 522 for the internal IP address 192.168.1.1 indicates that compute node 512 has first priority, that compute node 514 has second priority, that compute node 518 has third priority, and that compute node 516 has fourth priority. Since compute node 512 is offline, the system determines that compute node 514 is next in line to assume responsibility for the internal IP address 192.168.1.1. Accordingly, the compute node 514 updates the ARP table 524 to specify that the reassigned internal IP address 192.16.1.1 should resolve to compute node 514 instead of compute node 512.

Similarly, the priority order table 526 for the internal IP address 192.168.1.5 indicates that compute node 512 has first priority, that compute node 518 has second priority, that compute node 514 has third priority, and that compute node 516 has fourth priority. Since compute node 512 is offline, the system determines that compute node 518 is next in line to assume responsibility for the internal IP address 192.168.1.5. Accordingly, the compute node 518 updates the ARP table 524 to specify that the reassigned internal IP address 192.168.1.5 should resolve to compute node 518 instead of compute node 512.

Thus, the ARP table 524 is updated to specify that client requests routed to internal IP addresses 192.168.1.1 and 192.168.1.2 are processed by compute node 514, client requests routed to internal IP address 192.168.1.3 are processed by compute node 516, and client requests routed to internal IP addresses 192.168.1.4 and 192.168.1.5 are processed by compute node 518.

Figure 6A:
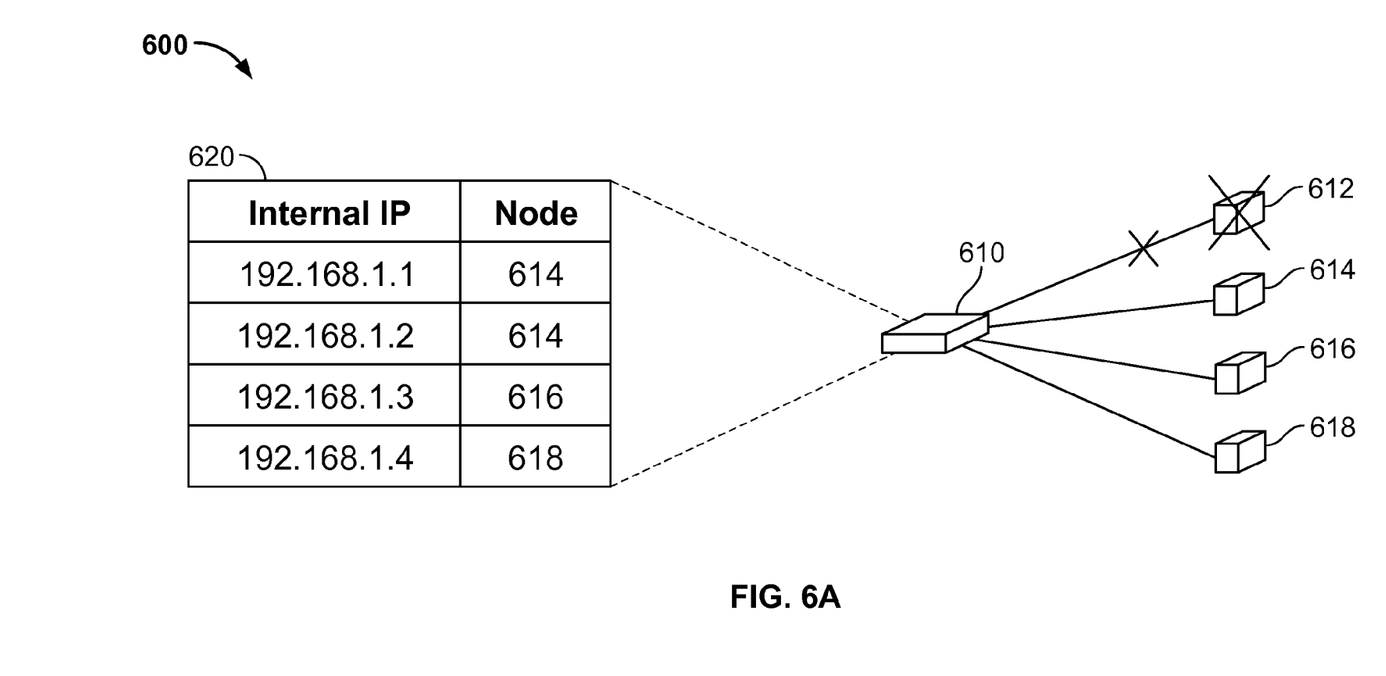
FIGS. 6A and 6B are illustrations of an example node recovery scenario.

FIG. 6A is an illustration of a node recovery scenario in an example system 600. The example system 600 includes a front-end switch 610 (e.g., a networking switch) and compute nodes 612, 614, 616, and 618. An ARP table 620 that resides on the front-end switch 610 is shown. In FIG. 6A, the compute node 612 is offline and cannot process requests. Accordingly, the system has reassigned the internal IP addresses to the other compute nodes 614, 616, and 618, such that requests sent to the internal IP addresses 192.168.1.1, 192.168.1.2, 192.168.1.3, and 192.168.1.4 can be received and processed by the other compute nodes 614, 616, and 618.

Figure 6B:
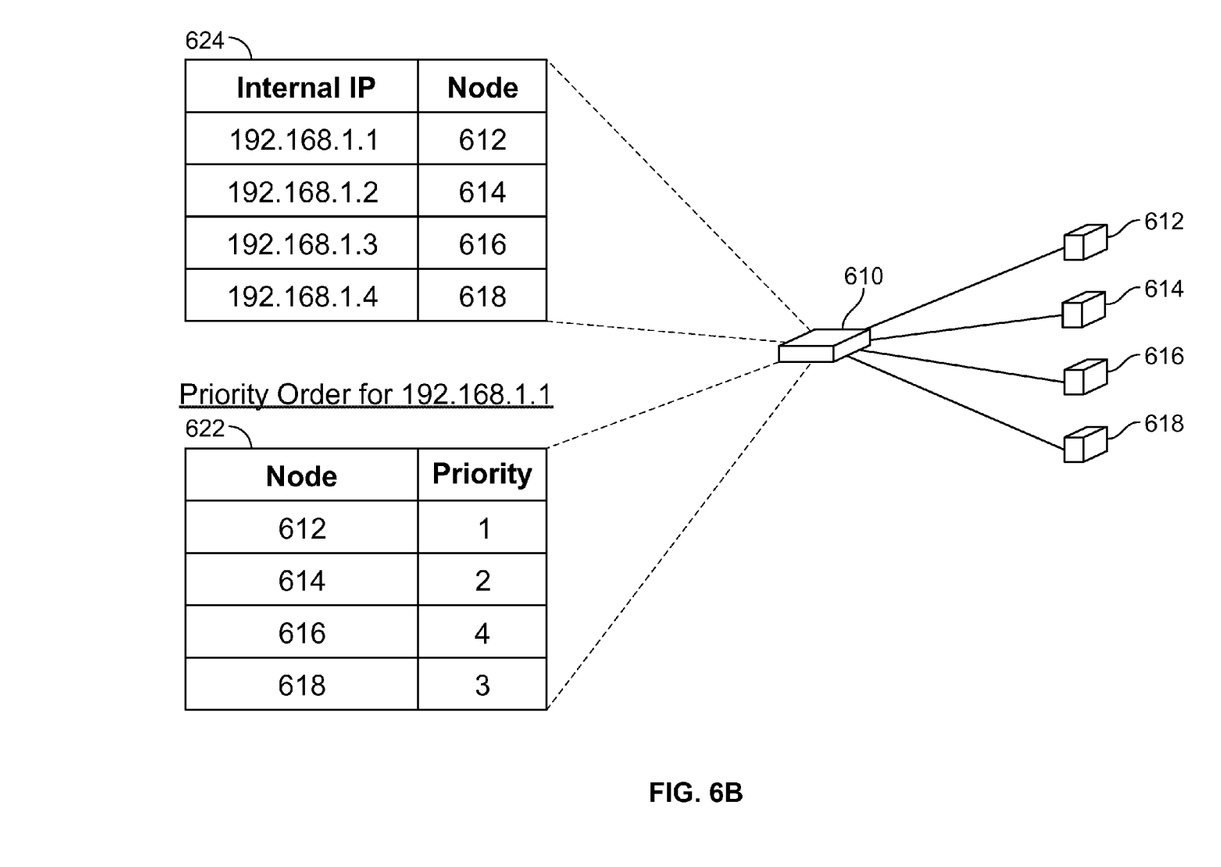

FIG. 6B is an illustration of a node recovery scenario in an example system 600. The example system 600 includes a front-end switch 610 (e.g., a networking switch) and compute nodes 612, 614, 616, and 618. An ARP table 620 that resides on the front-end switch 610 is shown. In FIG. 6B, the compute node 612 is now back online and can resume processing requests routed to its assigned internal IP address (e.g., 192.168.1.1), as determined based on the priority order table 522 for the internal IP address 192.168.1.1. Accordingly, the compute node 612 broadcasts status messages to the other compute nodes 614, 616, and 618, indicating that the compute node 612 is reclaiming the internal IP address 192.168.1.1. Upon receiving the status messages, the compute node 614, which was assigned the internal IP addresses 192.168.1.1 when the compute node went offline) releases the internal IP addresses so that it may be reclaimed by the compute node 612.

In some implementations, a compute node reclaims internal IP addresses that were previously assigned to it by updating the ARP table. In such implementations, the compute node reclaiming an internal IP address updates the ARP table to specify that the reclaimed internal IP addresses should resolve to the MAC address corresponding to that compute node. For example, if a particular compute node, which was previously assigned an internal IP address 192.168.1.1, comes back online, then the particular compute node can reclaim the previously assigned internal IP address 192.168.1.1 by updating the ARP table to specify that any requests routed to these internal IP addresses should resolve to the MAC address for the particular compute node.

In some other implementations, a compute node reclaims internal IP addresses based in part on a specified priority order, where the internal IP addresses are reclaimed if priority order for the reclaiming compute node is higher than other compute nodes. For example, a content cluster can include a first, second, and third compute node, where the first compute node has a priority of 2 for an internal IP address 192.168.1.2, where the second node has a priority of 1, and where the third compute node has a priority of 3. In this example, the second compute node has the highest priority order for the internal IP address 192.168.1.2 and, therefore, can reclaim that internal IP address over the first or third compute node at any time upon returning to an online state. Similarly, if the second and third compute nodes were offline and the first compute node was assigned the internal IP address 192.168.1.2, then the third compute node could reclaim the internal IP address 192.168.1.2 from the first compute node upon returning to an online state, since the third compute node has a higher priority order than the first compute node.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by one or more computing devices, the method comprising:
    receiving a plurality of requests from a plurality of client devices sent to a public internet protocol address;
    for each received request, processing the request to determine an internal Internet protocol address to associate with the request;
    routing each request to the internal Internet protocol address of a plurality of internal Internet protocol addresses associated with the request, wherein each internal Internet Protocol address is assigned to a respective compute node of a plurality of compute nodes, and wherein the one or more compute nodes process the routed requests;
    determining a particular compute node is offline, wherein the particular compute node is assigned one or more internal Internet protocol addresses; and
    in response to the determination that the particular compute node is offline, reassigning the one or more internal Internet protocol addresses corresponding to the particular compute node to one or more different compute nodes, wherein requests communicated to the reassigned internal Internet protocol addresses are communicated to the one or more different compute nodes for processing,
    wherein each internal Internet protocol address is reassigned according to a failover order for the internal Internet protocol address with respect to each of the other compute nodes of the plurality of compute nodes, and wherein the failover order for each internal Internet protocol address is based on historical computing workload data for each internal Internet protocol address of the particular compute node, a number of requests sent to each internal Internet Protocol address, a complexity of the requests sent to each internal Internet Protocol address, and historic computing workload data of each of the other compute nodes.

2. The method of claim 1, wherein routing the requests to one or more internal Internet protocol addresses comprises using a hash table to hash an incoming request to a particular internal Internet protocol address.

3. The method of claim 1, wherein the one or more internal Internet protocol addresses correspond to one or more compute nodes based in part on a Media Access Control address corresponding to the internal Internet protocol address, wherein the Media Access Control address is identified by performing a lookup operation in an Address Resolution Protocol table.

4. The method of claim 1, wherein routing the requests to one or more internal Internet protocol addresses, wherein the one or more internal Internet protocol addresses correspond to one or more compute nodes comprises communicating the request to Media Access Control addresses corresponding to the one or more internal Internet protocol addresses.

5. The method of claim 1, wherein a public Internet protocol address is associated with one or more internal Internet protocol addresses using equal-cost multi-path routing techniques.

6. The method of claim 1, wherein determining a particular compute node in a plurality of compute nodes is offline comprises:
    monitoring a broadcast from the particular compute node, wherein the broadcast is communicated at a first specified time interval; and
    determining a disruption in the broadcast from the particular compute node in a case where the broadcast is not received within a second specified time interval.

7. The method of claim 1, wherein reassigning the internal Internet protocol addresses associated with the particular compute node to one or more different compute nodes comprises updating, in an Address Resolution Protocol table, one or more Media Access Control addresses corresponding to the internal Internet protocol addresses, wherein the one or more Media Access Control addresses are associated with the one or more different compute nodes.

8. The method of claim 1, wherein reassigning the internal Internet protocol addresses further comprises:
    determining the failover order for each internal IP address with respect to a plurality of compute nodes; and
    assigning one or more internal internet protocol addresses to a next compute node in the failover order that is online.

9. A system comprising:
    one or more first computing devices configured to:
        receive a plurality of requests from a plurality of client devices sent to a public internet protocol address;
        for each received request, processing the request to determine an internal Internet protocol address to associate with the request;
        route each request to the internal Internet protocol address of a plurality of internal Internet protocol addresses associated with the request, wherein each internal Internet Protocol address is assigned to a respective compute node of a plurality of compute nodes, and wherein the one or more compute nodes process the routed requests;
        determine a particular compute node is offline, wherein the particular compute node is assigned one or more internal Internet protocol addresses; and
        in response to the determination that the particular compute node is offline, reassigning the one or more internal Internet protocol addresses corresponding to the particular compute node to one or more different compute nodes, wherein requests communicated to the reassigned internal Internet protocol addresses are communicated to the one or more different compute nodes for processing,
        wherein each internal Internet protocol address is reassigned according to a failover order for the internal Internet protocol address with respect to each of the other compute nodes of the plurality of compute nodes, and wherein the failover order for each internal Internet protocol address is based on historical computing workload data for each internal Internet protocol address of the particular compute node, a number of requests sent to each internal Internet Protocol address, a complexity of the requests sent to each internal Internet Protocol address, and historic computing workload data of each of the other compute nodes.

10. The system of claim 9, wherein routing the requests to one or more internal Internet protocol addresses comprises using a hash table to hash an incoming request to a particular internal Internet protocol address.

11. The system of claim 9, wherein the one or more internal Internet protocol addresses correspond to one or more compute nodes based in part on a Media Access Control address corresponding to the internal Internet protocol address, wherein the Media Access Control address is identified by performing a lookup operation in an Address Resolution Protocol table.

12. The system of claim 9, wherein routing the requests to one or more internal Internet protocol addresses, wherein the one or more internal Internet protocol addresses correspond to one or more compute nodes comprises communicating the request to Media Access Control addresses corresponding to the one or more internal Internet protocol addresses.

13. The system of claim 9, wherein a public Internet protocol address is associated with one or more internal Internet protocol addresses using equal-cost multi-path routing techniques.

14. The system of claim 9, wherein determining a particular compute node in a plurality of compute nodes is offline comprises:
monitoring a broadcast from the particular compute node, wherein the broadcast is communicated at a first specified time interval; and
determining a disruption in the broadcast from the particular compute node in a case where the broadcast is not received within a second specified time interval.

15. The system of claim 9, wherein reassigning the internal Internet protocol addresses associated with the particular compute node to one or more different compute nodes comprises updating, in an Address Resolution Protocol table, one or more Media Access Control addresses corresponding to the internal Internet protocol addresses, wherein the one or more Media Access Control addresses are associated with the one or more different compute nodes.

16. The system of claim 9, wherein reassigning the internal Internet protocol addresses further comprises:
determining the failover order for each internal IP address with respect to a plurality of compute nodes; and
assigning one or more internal internet protocol addresses to a next compute node in the failover order that is online.

17. A storage medium have instructions stored thereon that, when executed by data processing apparatus, cause the data processing apparatus to perform operations comprising:
receiving a plurality of requests from a plurality of client devices sent to a public internet protocol address;
for each received request, processing the request to determine an internal Internet protocol address to associate with the request;
routing each request to the internal Internet protocol address of a plurality of internal Internet protocol addresses associated with the request, wherein each internal Internet Protocol address is assigned to a respective compute node of a plurality of compute nodes, and wherein the one or more compute nodes process the routed requests;
determining a particular compute node is offline, wherein the particular compute node is assigned one or more internal Internet protocol addresses; and
in response to the determination that the particular compute node is offline, reassigning the one or more internal Internet protocol addresses corresponding to the particular compute node to one or more different compute nodes, wherein requests communicated to the reassigned internal Internet protocol addresses are communicated to the one or more different compute nodes for processing,
wherein each internal Internet protocol address is reassigned according to a failover order for the internal Internet protocol address with respect to each of the other compute nodes of the plurality of compute nodes, and wherein the failover order for each internal Internet protocol address is based on historical computing workload data for each internal Internet protocol address of the particular compute node, a number of requests sent to each internal Internet Protocol address, a complexity of the requests sent to each internal Internet Protocol address, and historic computing workload data of each of the other compute nodes.

18. The storage medium of claim 17, wherein routing the requests to one or more internal Internet protocol addresses comprises using a hash table to hash an incoming request to a particular internal Internet protocol address.

19. The storage medium of claim 17, wherein the one or more internal Internet protocol addresses correspond to one or more compute nodes based in part on a Media Access Control address corresponding to the internal Internet protocol address, wherein the Media Access Control address is identified by performing a lookup operation in an Address Resolution Protocol table.

20. The storage medium of claim 17, wherein routing the requests to one or more internal Internet protocol addresses, wherein the one or more internal Internet protocol addresses correspond to one or more compute nodes comprises communicating the request to Media Access Control addresses corresponding to the one or more internal Internet protocol addresses.

21. The storage medium of claim 17, wherein a public Internet protocol address is associated with one or more internal Internet protocol addresses using equal-cost multi-path routing techniques.

22. The storage medium of claim 17, wherein determining a particular compute node in a plurality of compute nodes is offline comprises:
monitoring a broadcast from the particular compute node, wherein the broadcast is communicated at a first specified time interval; and
determining a disruption in the broadcast from the particular compute node in a case where the broadcast is not received within a second specified time interval.

23. The storage medium of claim 17, wherein reassigning the internal Internet protocol addresses associated with the particular compute node to one or more different compute nodes comprises updating, in an Address Resolution Protocol table, one or more Media Access Control addresses corresponding to the internal Internet protocol addresses, wherein the one or more Media Access Control addresses are associated with the one or more different compute nodes.

24. The storage medium of claim 17, wherein reassigning the internal Internet protocol addresses further comprises:
determining the failover order for each internal IP address with respect to a plurality of compute nodes; and
assigning one or more internal internet protocol addresses to a next compute node in the failover order that is online.

* * * * *